(12) United States Patent
Chandrasekaran (10) Patent No.: US 7,616,578 B2
(45) Date of Patent: *Nov. 10, 2009

(54) FORWARDING TRAFFIC FLOW INFORMATION USING AN INTELLIGENT LINE CARD

(75) Inventor: Varagur Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 11/104,132

(22) Filed: Apr. 11, 2005

(65) Prior Publication Data

US 2006/0227776 A1    Oct. 12, 2006

(51) Int. Cl.
   H04J 1/16    (2006.01)
   H04L 12/28   (2006.01)
   H04L 12/56   (2006.01)
   G06F 15/173  (2006.01)

(52) U.S. Cl. .................. 370/241; 370/389; 370/396; 709/224

(58) Field of Classification Search .............. 370/389
   See application file for complete search history.

(56) References Cited

U.S. PATENT DOCUMENTS

| | | | |
|---|---|---|---|
| 6,233,236 B1 * | 5/2001 | Nelson et al. | 370/359 |
| 6,636,908 B1 * | 10/2003 | Winokur et al. | 710/29 |
| 7,100,394 B2 * | 9/2006 | Bieberich et al. | 62/420 |
| 7,324,537 B2 * | 1/2008 | Samudrala et al. | 370/412 |
| 2004/0049564 A1 * | 3/2004 | Ng et al. | 709/223 |
| 2005/0053073 A1 * | 3/2005 | Kloth et al. | 370/395.41 |
| 2006/0050647 A1 | 3/2006 | Dugan et al. | |
| 2006/0104269 A1 * | 5/2006 | Perozo et al. | 370/389 |
| 2006/0271677 A1 | 11/2006 | Mercier | |

OTHER PUBLICATIONS

PCT Int'l Search Report, PCT Application No: PCT/US06/13748, mailed Jul. 9, 2007.
PCT Written Opinion, PCT Application No. PCT/US06/13748, mailed Jul. 9, 2007.

* cited by examiner

Primary Examiner—Daniel J. Ryman
Assistant Examiner—Cassandra Decker
(74) Attorney, Agent, or Firm—Weaver Austin Villeneuve & Sampson LLP (57) ABSTRACT

Methods and apparatus are provided for monitoring traffic characteristics using intelligent line cards. Selected flows are configured for monitoring based on characteristics such as an initiator target pairing or an initiator target and logical unit (LUN) grouping. Frames such as command frames associated with selected flows are forwarded to both an output port and a switch port analyzer (SPAN).

17 Claims, 7 Drawing Sheets

FORWARDING TRAFFIC FLOW INFORMATION USING AN INTELLIGENT LINE CARD

CROSS REFERENCE TO RELATED APPLICATIONS

The present application is related to concurrently filed U.S. patent application Ser. No. 11/104,132, titled DETERMINING TRAFFIC FLOW CHARACTERISTICS IN A STORAGE AREA NETWORK by Varagur Chandrasekaran, Giridhar Rajaram, Srinivas Avasarala, and Sanjaya Kumar, the entirety of which is incorporated by reference for all purposes.

BACKGROUND OF THE INVENTION

1. Field of the Invention

The present invention generally relates to storage area networks. More specifically, the present invention provides mechanisms for forwarding traffic information using an intelligent line card.

2. Description of Related Art

In storage area networks, it is often useful to determine traffic characteristics. Fibre channel analyzers, protocol analyzers, and network analyzers are connected to line card ports to snoop traffic and determine traffic characteristics and statistics. However, physically connecting and reconnecting fibre channel analyzers can be cumbersome.

One technique for more efficiently using fibre channel analyzers involves connecting an analyzer to a fibre channel switch port. The fibre channel switch forwards data to the switch port analyzer (SPAN). If a fibre channel switch determines that it wishes to monitor data from a particular input port. Data from that input port is forwarded and also copied to the switch port analyzer. In some instances, SPAN merely forwards the data to a fibre channel analyzer. In other examples, SPAN forwards data to another fibre channel switch or a separate processing entity altogether.

However, existing mechanisms for determining traffic characteristics using mechanisms such as analyzers and SPAN are limited. Consequently, it is therefore desirable to provide methods and apparatus for improving the ability to forward information to a switch port analyzer.

SUMMARY OF THE INVENTION

Methods and apparatus are provided for monitoring traffic characteristics using intelligent line cards. Selected flows are configured for monitoring based on characteristics such as an initiator target pairing or an initiator target and logical unit (LUN) grouping. Frames such as command frames associated with selected flows are forwarded to both an output port and a switch port analyzer (SPAN).

In one embodiment, a method for forwarding data at a fibre channel switch is provided. Fibre channel data is received at a line card associated with the fibre channel switch. Command frames are snooped at the line card. The line card includes a data path processor configured to monitor fibre channel data received on the input port. It is determined that the command frame is associated with a selected flow. The selected flow is identified using initiator and target information. Selected flow information is forwarded to a switch port analyzer.

In another embodiment, a fibre channel switch is provided. The fibre channel switch includes an input port, a data path processor, and an output port. The input port is configured to receive fibre channel data associated with the fibre channel switch. The data path processor is configured to monitor fibre channel data received on the input port and snoop for command frames to determine that the command frame is associated with a selected flow. The selected flow is identified using initiator and target information. An output port associated with a switch port analyzer is used for forwarding selected flow information.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Fibre channel switches in a storage area network are used to connect entities such as hosts to storage resources such as disks. Fibre channel switches include line cards with multiple ports to allow connection with external entities. In many instances, line cards in fibre channel switches handle traffic from multiple initiators and direct traffic to multiple destinations. Traffic typically has to be forwarded at line rate and consequently extensive processing cannot be performed on the traffic and a fibre channel switch.

In many instances, it is useful to have information about particular traffic patterns. For example, it may be useful to determine the round-trip time for fibre channel frames traveling from a host to a particular disk array, or it may be useful to determine the number of frames dropped between a host and a tape device. In may also be useful to determine the total number of frames transmitted for a particular application for an initiator target pair.

However, conventional fibre channel switches do not provide the ability to determine flow statistics. In many instances, fibre channel switches provide only coarse information for total traffic transmitted through a particular switch. In other examples, fibre channel switches need to be hooked up to external appliances such as fibre channel analyzers, network analyzers, or protocol analyzers. These analyzers are dedicated devices specifically configured to snoop traffic and provide detailed information and traffic patterns.

However, fibre channel analyzers often have to be physically connected to fibre channel switch ports. In order to snoop traffic for another switch port, the fibre channel analyzer has to be physically disconnected and connected to a different port. Furthermore, lack of integration with a fibre channel switch may make data difficult it manage. One technique for more efficiently using fibre channel analyzers involves connecting an analyzer to a fibre channel switch port. The fibre channel switch forwards data to the switch port analyzer (SPAN). If a fibre channel switch determines that it wishes to monitor data from a particular input port. Data from that input port is forwarded and also copied to the switch port analyzer. In some instances, SPAN merely forwards the data to a fibre channel analyzer. In other examples, SPAN forwards data to another fibre channel switch or a separate processing entity altogether.

The separate fibre channel switch or separate processing system can aggregate data from all switch port analyzers and run more detailed analysis algorithms on the traffic. However, forwarding data to a switch port analyzer can consume valuable bandwidth. Fibre channel switches are configured to forward all data from particular input ports to the switch port analyzer. In many instances, forwarding all information from an input port is a substantial burden on a fibre channel switch. Furthermore, switch port analyzer information is often forwarded onto a fibre channel fabric. Consequently, forwarding a substantial amount of information can lead to drops or consume valuable bandwidth.

In many instances, a substantial amount of information may not need to be monitored. For example a network administrator may only wish to know statistics for traffic flowing between two particular entities. The network administrator may even want more specific information such as traffic flow patterns between an initiator and a target for a particular LUN.

Consequently, the techniques of the present invention provide an intelligent line card for monitoring traffic flows to determine traffic statistics on a more particular level. In one example, the techniques of the present invention allow retrieval of SCSI level statistics on a per LUN basis for any two devices in a storage area network. In some instances, statistics for the traffic flow or particular selected traffic flow can be determined at an intelligent line card.

In other examples, traffic for selected flows can be forwarded to a switch port analyzer. By forwarding only selected traffic to a switch port analyzer, substantial amount of network bandwidth can be conserved. External devices are no longer required for measuring statistics. A network administrator has the flexibility to dynamically configure monitoring of particular flows. Traffic information can be intelligently managed. In some instances, selected information is forwarded to a processing entity that can be used to perform additional analysis on the statistical information.

Figure 1:
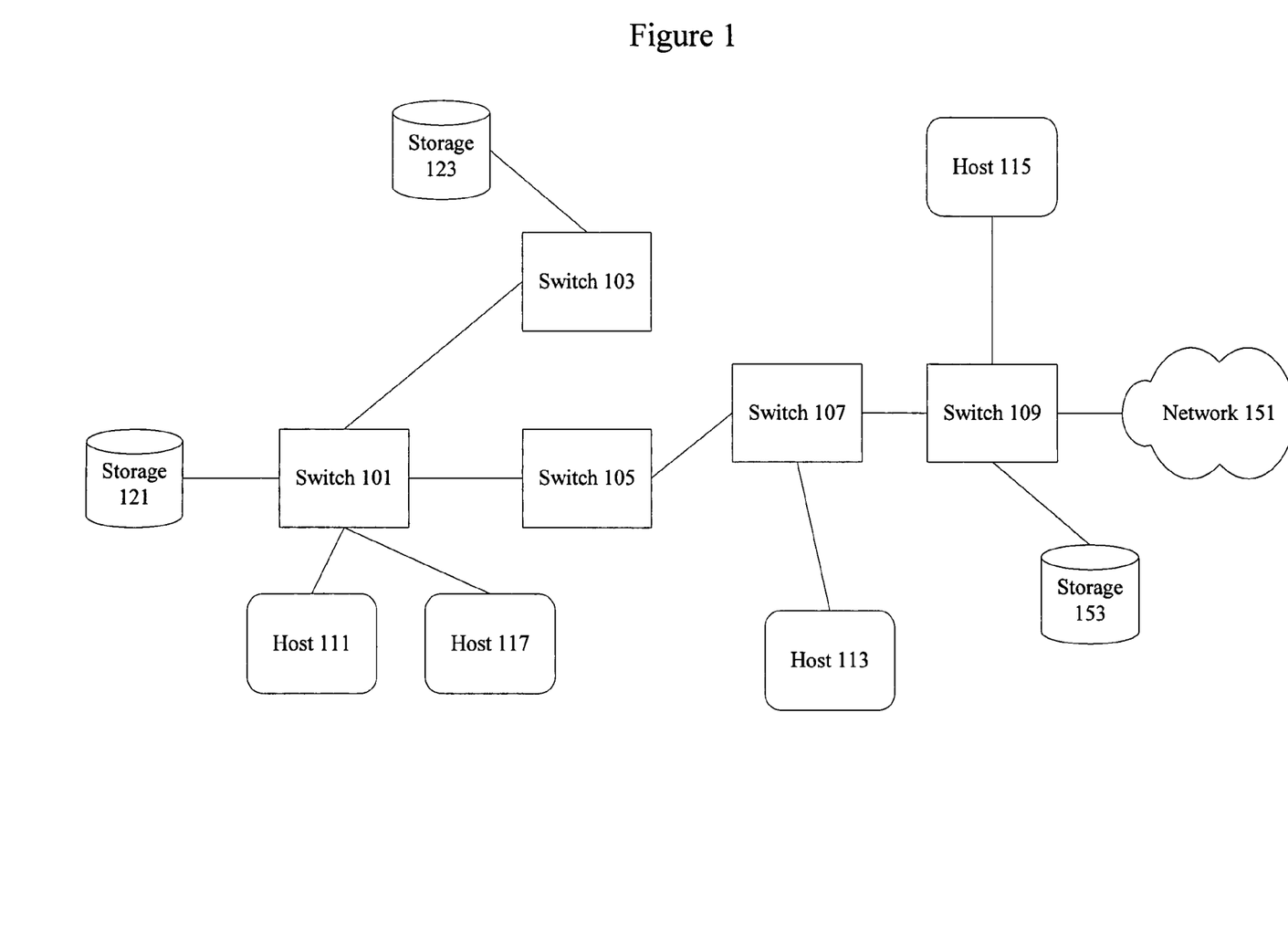
FIG. 1 is a diagrammatic representation showing a storage area network.

FIG. 1 is a diagrammatic representation of one example of a storage area network that uses the techniques of the present invention. A switch 101 is coupled to switches 103 and 105 as well as to a host 111, a host 117, and storage 121. In one embodiment, host 111 is a server or client system while storage 121 is any storage subsystem such as a single disk or a redundant array of independent disks (RAID). Switch 105 is coupled to switch 107. In typical implementations, switches 101-109 provide only very coarse statistical information on traffic flows, such as total frames transmitted or frame count. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-port. Non fabric-ports include interswitch ports (E-ports). Ports used to connect a switch to a host are referred to herein as fabric-ports (F-ports). In one example, E-ports are used to connect switch 105 to switch 107 while F-ports are used to connect switch 107 to host 113. Similarly, fabric loop-ports (FL-ports) are used to connect switch 103 to storage resource 123. In some instances, storage devices can be connected using F-ports.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 123 and 153 may be fabric loops coupled respectively to switches 103 and 109 through FL-ports. The fabric loops typically include multiple storage devices. Any mechanism for connecting multiple storage devices that allows only access to a subset of devices at any point in time. In one example, a loop is a Small Computer Systems Interface (SCSI) loop that allows connection of 8 or 16 devices in a half-duplex framework.

Figure 2:
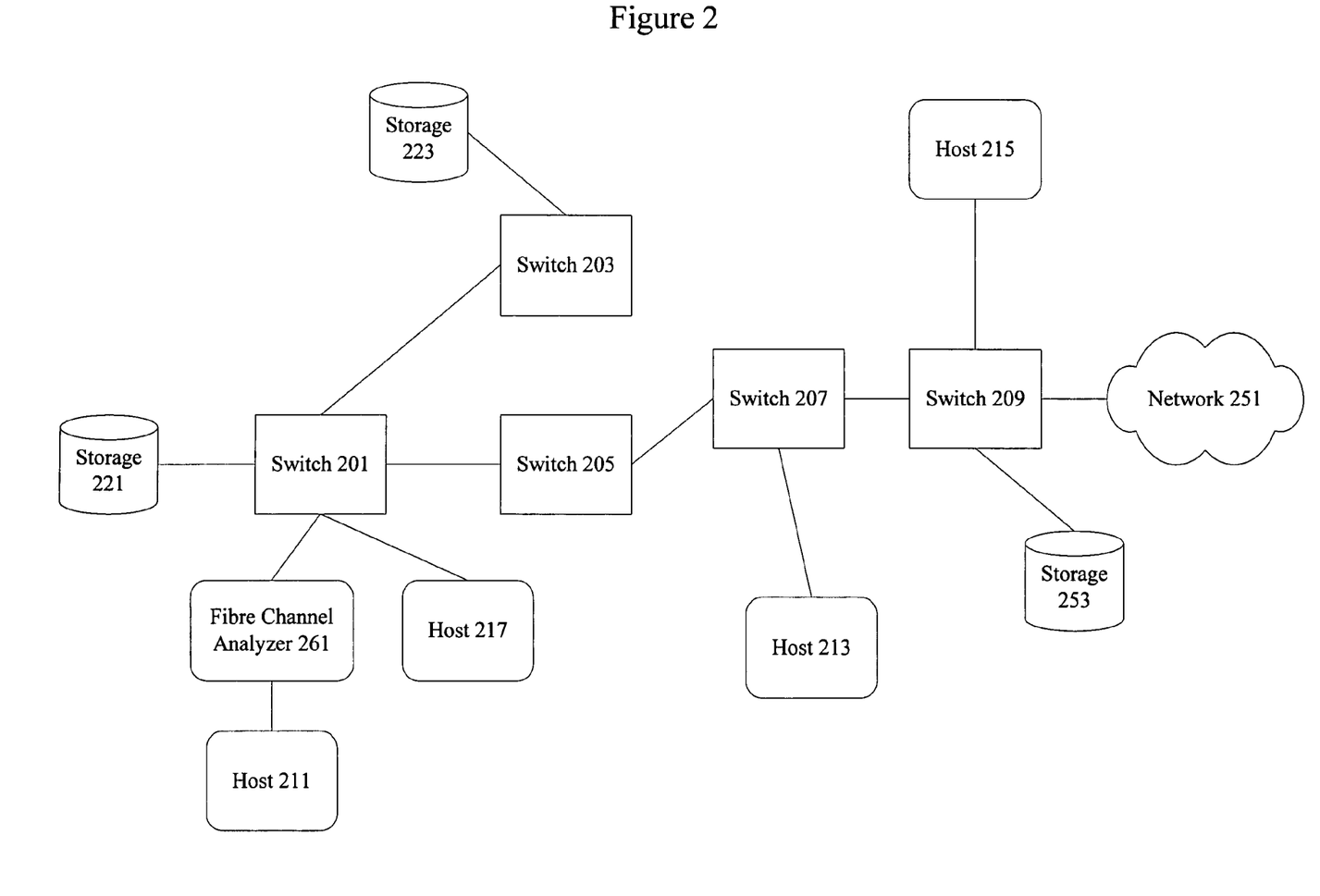
FIG. 2 is a diagrammatic representation showing a protocol analyzer connected to a storage area network.

FIG. 2 is a diagrammatic representation of one example of a network having a protocol analyzer used to monitor traffic. A switch 201 is coupled to switches 203 and 205 as well as to a host 211, a host 217, and storage 221. In one embodiment, host 211 is a server or client system while storage 221 is any storage subsystem such as a single disk or a redundant array of independent disks (RAID). Switch 205 is coupled to switch 207. In one example, an analyzer 261 is connected between host 211 and switch 201.

Switch 207 is connected to host 213 and switch 203 is connected to storage resource 223. Switch 209 is connected to host 215, switch 207, storage resource 253, and an external network 251 that may or may not use fibre channel. In order for a host 211 to access network 251, a path going through switch 205 can be used. It should be noted that any apparatus including a processor, memory, and a connection to a fibre channel fabric can be referred to as a fibre channel switch.

In one example, E-ports are used to connect switch 205 to switch 207 while F-ports are used to connect switch 207 to host 213. Similarly, fabric loop-ports (FL-ports) are used to connect switch 203 to storage resource 223.

According to various embodiments, a packet transmitted from host 211 to a network 251 or to storage resource 253 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 223 and 253 may be fabric loops coupled respectively to switches 203 and 209 through FL-ports. The fabric loops typically include multiple storage devices. Any mechanism for connecting multiple storage devices that allows only access to a subset of devices at any point in time. In one example, a loop is a Small Computer Systems Interface (SCSI) loop that allows connection of 8 or 16 devices in a half-duplex framework.

In typical implementations, switches 201-209 provide only very coarse statistical information on traffic flows, such as total frames transmitted or frame count. Consequently, to determine more detailed information, a fibre channel analyzer 261 can be connected between a host 211 and a switch 201. The fibre channel analyzer can be used to snoop traffic between switch 201 and host 211 to determine characteristics associated with traffic flows. In some instances, the fibre channel analyzer may have to be connected to different ports associated with switch 201.

However, the analyzer 261 may introduce some delay into the data transmission. Furthermore, analyzers can be expensive and difficult to configure and manage properly, particularly if a single analyzer is used to monitor multiple ports or multiple switches.

According to various embodiments, the fibre channel analyzer 261 is connected to an output port associated with switch 201. Switch 201 can use the fibre channel analyzer 261 as a switch port analyzer (SPAN). Traffic received from input ports such as an input port associated with host 217 can be automatically forwarded to the switch port analyzer. In this manner, a single analyzer can handle traffic for multiple input ports. In some examples, the switch port analyzer may not actually be connected to the fibre channel analyzer but instead is connected to another switch configured to handle traffic analysis. In still other examples, traffic can be forwarded to the server configured to analyze traffic statistics. However, forwarding traffic to a switch port analyzer from multiple input ports or forwarding traffic to other switches or servers from multiple input ports can be burdensome and resource intensive.

In many instances, SPAN packets may be dropped in a network before they are received by any switch or server. Consequently, techniques of the present invention allow for the intelligent analysis of traffic flow to determine more specific flow statistics. With selected flows identified for snooping, a subset of information can be analyzed or forwarded to a switch port analyzer. In one embodiment, SCSI local statistics are determined on a per LUN basis for any two devices in a storage area without even the use of an external analyzer. In one embodiment, intelligent line cards are provided at edge ports such as the switch port connected to host 217. An intelligent line card provides hardware support for determining traffic statistics. In one example, traffic associated with a particular initiator target pair can be snooped. In another example, traffic associated with the particular initiator target and LUN grouping can be snooped.

Figure 3:
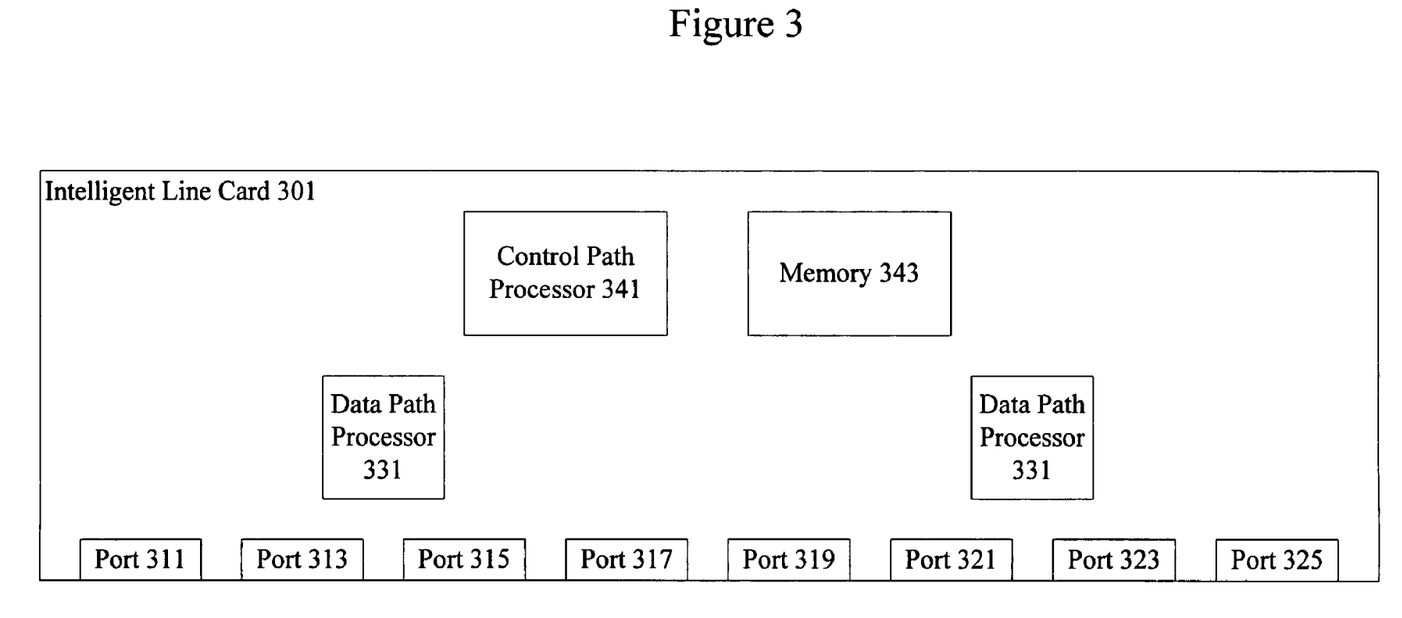
FIG. 3 is a diagrammatic representation showing an intelligent line card.

FIG. 3 is a diagrammatic representation of one example of an intelligent line card. According to various embodiments, the intelligent line card includes ports 311-325, data path processors 331 and 333, control path processor 341, and memory 343. Data path processors 331 and 333 are used to identify flow information and exchange information and output the data to the appropriate fibre channel switch port. The control path processor 341 is used to handle management functions and exceptions. Memory 343 can be used to hold statistical data gathered by a data path processor. In one embodiment, 8 data path processors are provided for 32 ports.

Although separate data path and control path processors are provided, it should be noted that in some instances, a single processor may be used to handle network traffic and control functions and exceptions. In other examples, additional processors may be provided. Any line card having hardware support for fibre channel packet snooping is referred to herein as an intelligent line card.

Figure 4:
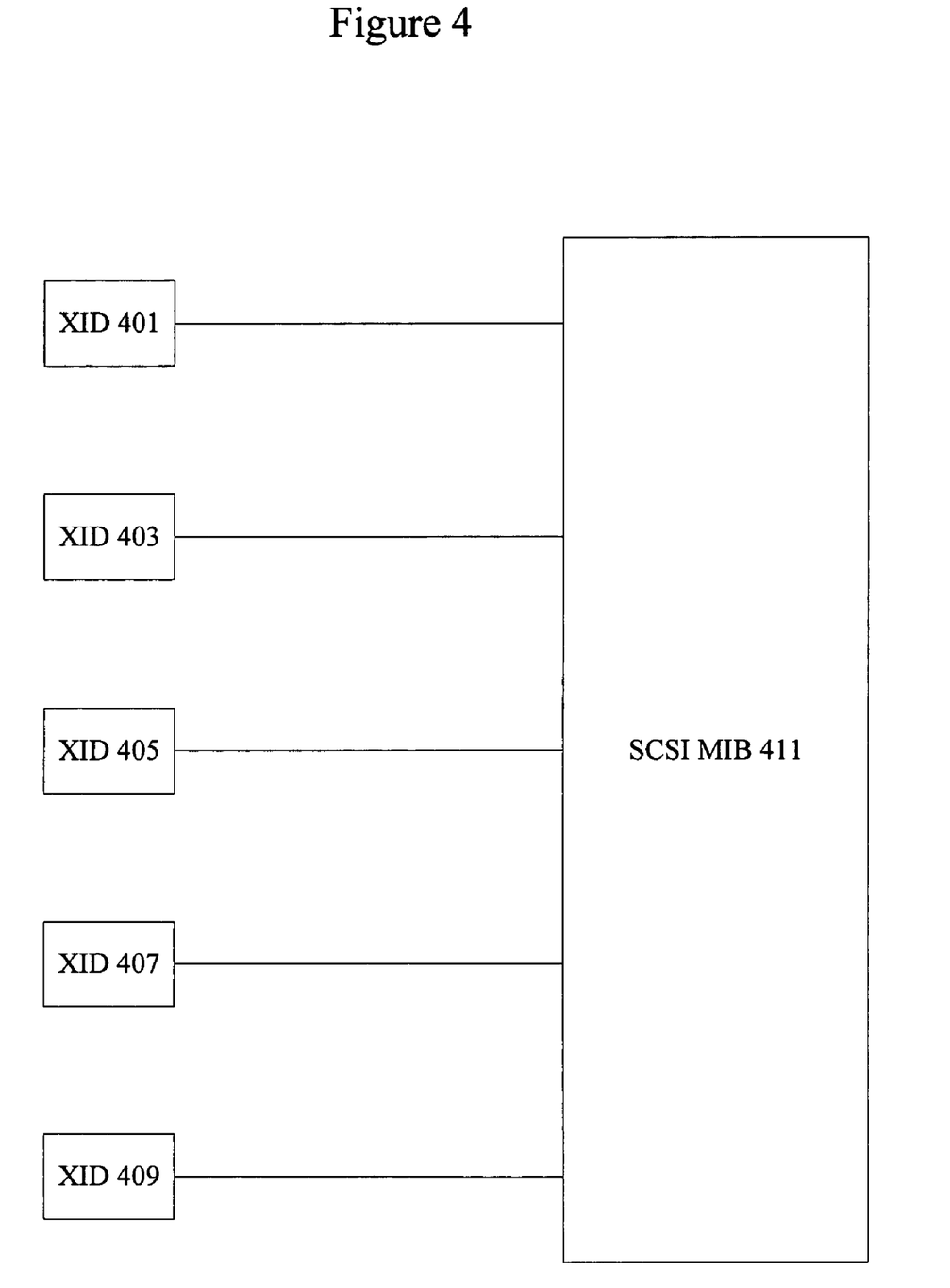
FIG. 4 is a diagrammatic representation depicting a mechanism for maintaining flow statistics.

FIG. 4 is a diagrammatic representation showing a mechanism for storing traffic statistics. According to various embodiments, a SCSI management information base is used to obtain statistical information associated with SCSI flows. In one embodiment, an intelligent line card snoops received traffic and determines if any traffic is associated with particular preconfigured flows. Selected initiator target pairs or initiator target LUN groupings can be preconfigured by a system administrator for monitoring. When an intelligent line card receives packets in selected pairs or groupings, information associated with the pairs or groupings is maintained.

In one example, an intelligent line card snoops packets indicating that a particular exchange is being established. When the exchange is established and the exchange corresponds to an administrator selected initiator target pairing, an exchange ID (XID) such as exchange ID 401, 403, 405, 407, or 409 is created and associated with a SCSI management information base (MIB) 411. Subsequent packets with the same exchange identifier can be stored or information associated with subsequent packets with the same exchange identifier can be stored. In one example, packets are stored momentarily until a SPAN copy of the packet is made.

The SCSI MIB includes information on managed objects. Although an available SCSI MIB can be used to manage SCSI flow statistics and information, it should be recognized that a wide range of databases and data structures can also be used.

Figure 5:
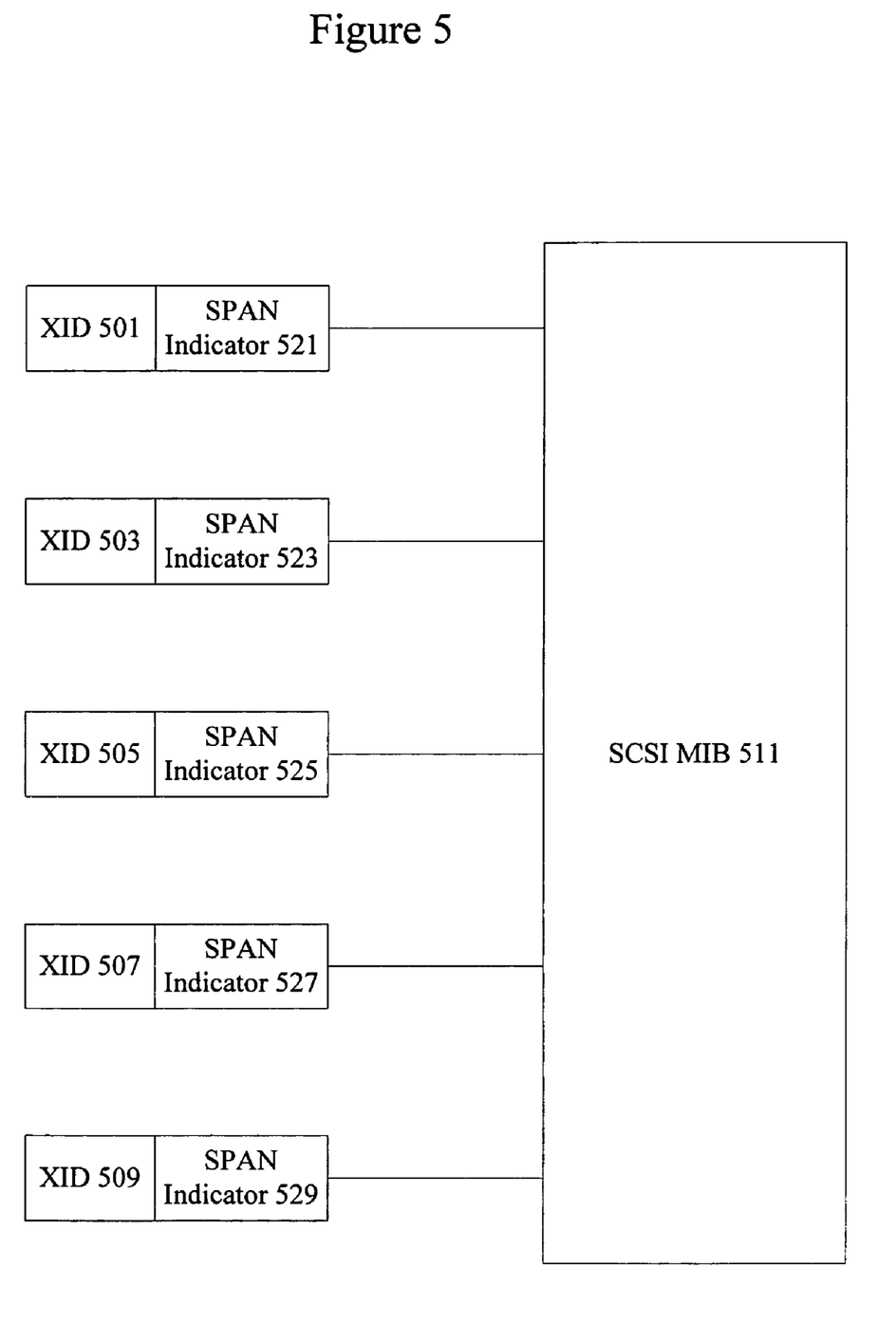
FIG. 5 is a diagrammatic representation showing a technique for maintaining switch port analyzer information.

FIG. 5 shows the use of a switch port analyzer with the SCSI MIB. According to various embodiments, SPAN indicators 521, 523, 525, 527, and 529 are associated with transaction identifiers 501, 503, 505, 507, and 509. If SPAN is enabled for a particular initiator target pair, a SPAN indicator such as SPAN indicator 521 can be toggled for an exchange such as exchange 501. Exchange level frames are sent to the SPAN port. In one example, information is forwarded to a switch port analyzer instead of being processed at a fibre channel switch line card.

A wide variety of statistics can be stored maintained using a SCSI MIB 511. In one example, the following read statistics are maintained:

I/O Total Count

I/O Fail Count

I/O Timeout Count

I/O Total Block Count

I/O Max Block Count

I/O Min Response Time

I/O Max Response Time

I/O Average Response Time

I/O Active Count

According to various embodiments, the following write statistics are also maintained:

I/O Total Count

I/O Fail Count

I/O Timeout Count

I/O Total Block Count

I/O Max Block Count

I/O Min Response Time

I/O Max Response Time

I/O Average Response Time

I/O Active Count

The read and write statistics allow a network administrator to determine characteristics of traffic between a particular initiator target pair. For example, it can be determined that the response time for read requests from a host to a particular tape drive has a range that does not meet application requirements. In conventional implementations, this could not be determined using network traffic characteristics. Conventional fibre channel switches only provided total count or total frame transmission information without being able to provide more specific information associated with a particular flow or exchange. Statistics such as response times involve an intelligent line card maintaining time stamp information for transmitted packets until response packets are received.

The following non read/write statistics can also be maintained:

Test Unit Ready

Report LUN

Inquiry

Read Capacity

Mode Sense

Request Sense

Rx Frame Count

Rx Frame Byte Count

Tx Frame Count

Tx Frame Byte Count

According to various embodiments, the following error statistics can also be provided on a per LUN per exchange basis.

Error Statistics

SCSI Status Busy

SCSI Status Reservation Conflict

SCSI Status Task Set Full

SCSI Status ACA Active

Sense Key Not Ready

Sense Key Medium Error

Sense Key Hardware Error

Sense Key Illegal Request

Sense Key Unit Attention

Sense Key Data Protect

Sense Key Blank Check

Sense Key Copy Aborted

Sense Key Aborted Command

Sense Key Volume Overflow

Sense Key Miscompare

ABTS

Figure 6:
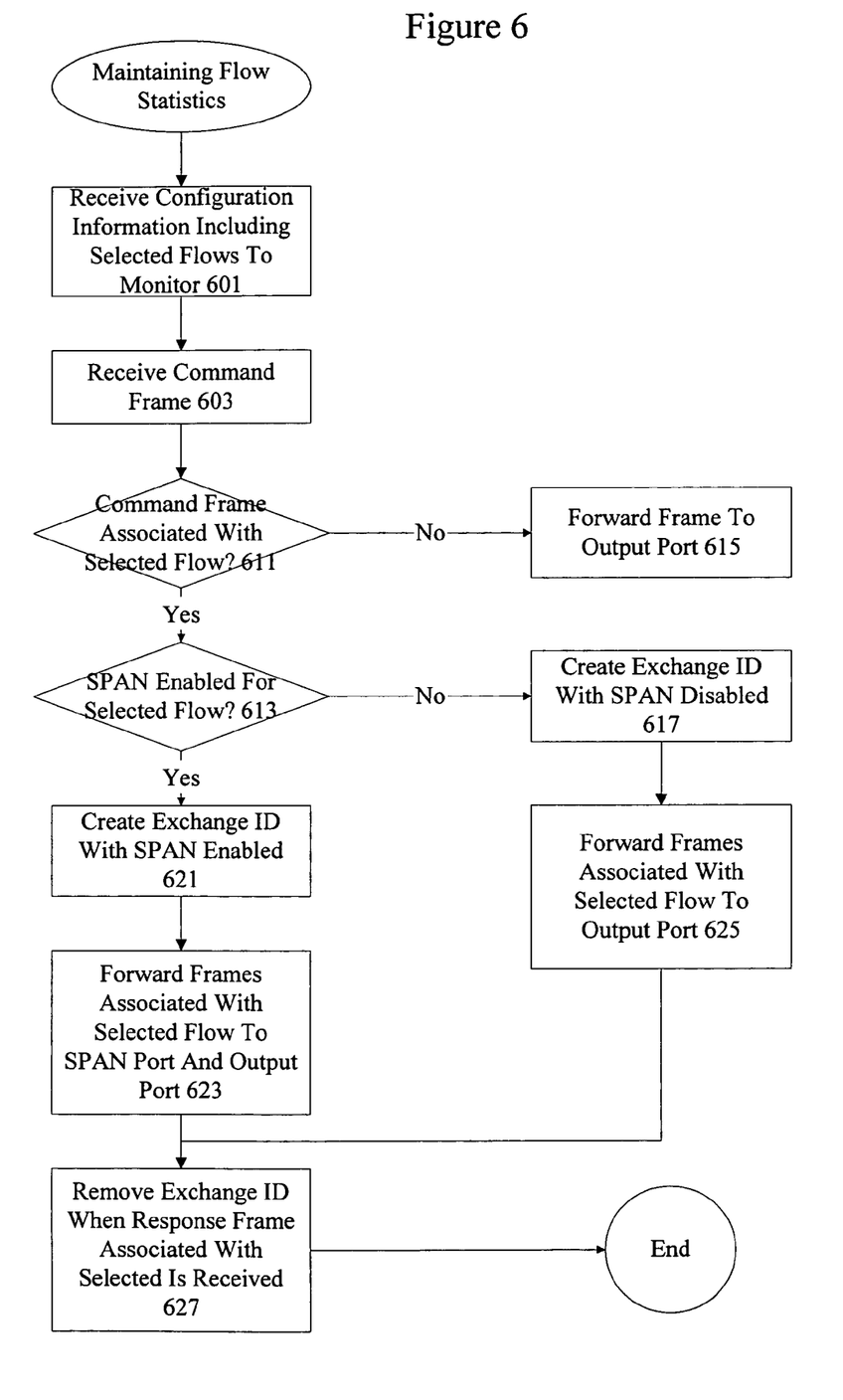
FIG. 6 is a, flow process diagram showing a technique for forwarding data.

FIG. 6 is a flow process diagram showing a technique for maintaining flow statistics. At 601, configuration information including selected flows to monitor is received at a fibre channel switch. A system administrator or a network administrator can identify particular initiator target pairs or initiator target LUN groupings for monitoring. Line cards associated with the fibre channel switch snoop traffic received to determine if traffic is associated with particular flows or exchanges. At 603, a command frame is received. The command frame is used to initiate an exchange between two fibre channel entities such as an initiator and target pair. At 611, it is determined if the command frame is associated with a selected flow. Any source and destination pairing such as an initiator target pair or an initiator target LUN grouping is referred to herein as a selected flow.

If the command frame is not associated with a selected flow at 611, the frame is forwarded to an output port at 615. If the command frame is associated with a selected flow, it is determined if SPAN is enabled for the selected flow at 613. If SPAN is not enabled, an exchange ID with SPAN disabled is created at 617. The exchange ID with SPAN disabled is associated with the database such as a management information base.

Frames associated with the selected flow are then forwarded to the output port 625. If SPAN is enabled for the selected flow at 613, an exchange identifier with SPAN enabled is created at 621. Frames associated with the selected flow are forwarded to the SPAN port as well as to the output port at 623. In some embodiments, data frames can be skipped while forwarding other SPAN frames to a switch port analyzer, to allow even more conservation of bandwidth. Data frames may not be that important for analyzing traffic patterns. Management applications can perform traffic pattern analysis as long as other frames in an exchange are delivered reliably. Frames associated with particular selected flows as identified by exchange identifiers are monitored and are forwarded to a SPAN port until the response frame associated with the selected flow is received. If the response frame associated with the selected flow is received, the exchange identifier is removed. Statistics such as minimum round-trip time, total frame count, fail count, etc. can be determined dynamically or generated after a response frame is received.

Figure 7:
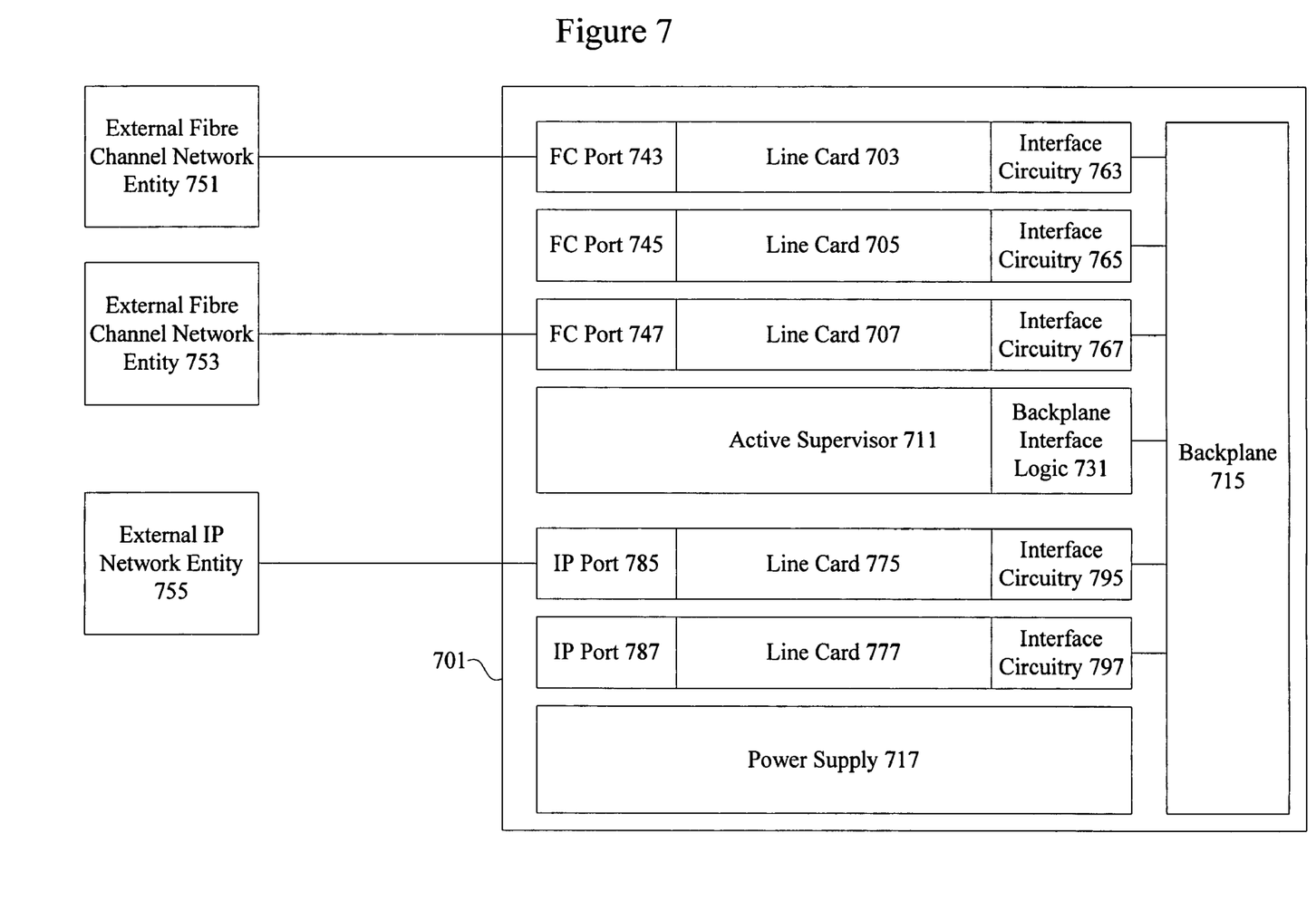
FIG. 7 is a diagrammatic representation showing a fibre channel switch.

FIG. 7 is a diagrammatic representation of one example of a fibre channel switch that can include an intelligent line card. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 763, 765, and 767 and the backplane 715. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. The fibre channel switch can also include line cards 775 and 777 with IP ports 785 and 787. In one example, IP port 785 is coupled to an external IP network entity 755. The line cards 775 and 777 also have interfaces 795 and 797 to the backplane 715.

It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for forwarding data at a fibre channel switch, the method comprising:

receiving fibre channel data at a line card associated with the fibre channel switch;

snooping for command frames at the line card, wherein the line card includes a data path processor configured to monitor fibre channel data received on an input port;

determining that a command frame is associated with a selected flow, wherein the selected flow is identified using initiator and target information;

determining that the selected flow is switch port analyzer (SPAN) enabled; and forwarding the command frame to a SPAN while skipping data frames if the command frame is associated with the selected flow and the selected flow is SPAN enabled;

wherein information for the selected flow is provided to the SPAN when a SPAN enable indicator is toggled on for the selected flow identified by an exchange identifier, wherein the SPAN enable indicator is toggled off when a response frame for the selected flow is received.

2. The method of claim 1, wherein the data path processor is configured to snoop frames associated with the selected flow.

3. The method of claim 1, wherein the line card includes a fibre channel edge port.

4. The method of claim 1, wherein the line card includes an intelligent port.

5. The method of claim 1, wherein the flows are identified using initiator, target, and logical unit (LUN) information.

6. The method of claim 1, wherein the data path processor is configured to transparently snoop all fibre channel data received.

7. A fibre channel switch, comprising:

an input port configured to receive fibre channel data associated with the fibre channel switch; and a data path processor configured to monitor the fibre channel data received on the input port and snoop for command frames to determine that a command frame is associated with a selected flow, wherein the selected flow is identified using initiator and target information, wherein the data path processor is further configured to determine that the selected flow is switch port analyzer (SPAN) enabled and forward the command frame to a SPAN while skipping data frames if the command frame is associated with the selected flow and the selected flow is SPAN enabled;

wherein information for the selected flow is provided to the SPAN when a SPAN enable indicator is toggled on for the selected flow identified by an exchange identifier, wherein the SPAN enable indicator is toggled off when a response frame for the selected flow is received.

8. The fibre channel switch of claim 7, wherein the data path processor is configured to snoop frames associated with the selected flow.

9. The fibre channel switch of claim 7, wherein the input port is included in a line card.

10. The fibre channel switch of claim 9, wherein the line card includes an intelligent port.

11. The fibre channel switch of claim 7, wherein the selected flow is identified using initiator, target, and logical unit (LUN) information.

12. The fibre channel switch of claim 7, wherein the data path processor is configured to transparently snoop all fibre channel data received.

13. A system for forwarding flow information at a fibre channel switch, the system comprising:

means for receiving fibre channel data at a line card associated with the fibre channel switch;

means for snooping for command frames at the line card, wherein the line card includes a data path processor configured to monitor the fibre channel data received on an input port;

means for determining that the command frame is associated with a selected flow, wherein the selected flow is identified using initiator and target information;

means for determining that the selected flow is switch port analyzer (SPAN) enabled; and means for forwarding the command frame to a SPAN while skipping data frames if the command frame is associated with the selected flow and the selected flow is SPAN enabled;

wherein information for the selected flow is provided to the SPAN when a SPAN enable indicator is toggled on for the selected flow identified by an exchange identifier, wherein the SPAN enable indicator is toggled off when a response frame for the selected flow is received.

14. The system of claim 13, wherein the data path processor is configured to snoop frames associated with the selected flow.

15. The system of claim 13, wherein the line card includes a fibre channel edge port.

16. The system of claim 13, wherein the line card includes multiple data path processors.

17. The system of claim 13, wherein the line card includes an intelligent port.

* * * * *

UNITED STATES PATENT AND TRADEMARK OFFICE
CERTIFICATE OF CORRECTION

PATENT NO. : 7,616,578 B2 Page 1 of 1
APPLICATION NO. : 11/104132
DATED : November 10, 2009
INVENTOR(S) : Varagur Chandrasekaran It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Nineteenth Day of October, 2010

David J. Kappos
*Director of the United States Patent and Trademark Office*